(12) United States Patent
Wheeler et al.

(10) Patent No.: US 7,007,174 B2
(45) Date of Patent: Feb. 28, 2006

(54) SYSTEM AND METHOD FOR DETERMINING USER IDENTITY FRAUD USING SIMILARITY SEARCHING

(75) Inventors: David B. Wheeler, Austin, TX (US); John R. Ripley, Round Rock, TX (US); Paul Leury, Cedar Park, TX (US); Steven C. Wotring, Austin, TX (US)

(73) Assignee: Infoglide Corporation, Austin, TX (US)

( * ) Notice: Subject to any disclaimer, the term of this patent is extended or adjusted under 35 U.S.C. 154(b) by 829 days.

(21) Appl. No.: 09/681,530

(22) Filed: Apr. 24, 2001

(65) Prior Publication Data

US 2001/0054151 A1 Dec. 20, 2001

Related U.S. Application Data

(60) Provisional application No. 60/201,073, filed on Apr. 26, 2000.

(51) Int. Cl.
*G06F 11/30* (2006.01)
*G06F 12/14* (2006.01)
*H04L 9/00* (2006.01)
*H04L 9/32* (2006.01)

(52) U.S. Cl. .............................. 713/201; 726/5; 726/8; 726/26

(58) Field of Classification Search ............... 713/182, 713/164; 726/26, 5, 8
See application file for complete search history.

(56) References Cited

U.S. PATENT DOCUMENTS

| | | | |
|---|---|---|---|
| 5,666,442 A | | 9/1997 | Wheeler |
| 5,774,650 A | * | 6/1998 | Chapman et al. ............ 713/200 |
| 6,026,398 A | * | 2/2000 | Brown et al. .................. 707/5 |
| 6,070,240 A | * | 5/2000 | Xydis .......................... 713/200 |
| 6,119,114 A | | 9/2000 | Smadja |
| 6,199,067 B1 | | 3/2001 | Geller |
| 6,374,237 B1 | * | 4/2002 | Reese ............................ 707/3 |
| 6,526,423 B1 | * | 2/2003 | Zawadzki et al. ........... 715/506 |
| 6,629,092 B1 | * | 9/2003 | Berke ............................ 707/3 |

* cited by examiner

*Primary Examiner*—Gilberto Barron, Jr.
*Assistant Examiner*—Venkat Perungavoor
(74) *Attorney, Agent, or Firm*—Taylor Russell & Russell, P.C.

(57) ABSTRACT

A method for verifying the identity of a new-user of a computer system, comprising the steps of receiving at least one identity attribute from the new-user; similarity searching the at least one new-user identity attribute against at least one database of denied-user identity attributes; receiving a similarity search result; determining a positive or negative match between the at least one new-user identity attribute and the denied-user identity attributes; allowing the new-user to access the computer system, where a negative match has been determined; and denying the new-user access to the computer system, where a positive match has been determined.

29 Claims, 3 Drawing Sheets

SYSTEM AND METHOD FOR DETERMINING USER IDENTITY FRAUD USING SIMILARITY SEARCHING

CROSS REFERENCE TO RELATED APPLICATIONS

Referenced-applications

This application claims the benefit of U.S. Provisional Application 60/201,073, filed Apr. 26, 2000.

BACKGROUND OF INVENTION

The current invention relates to identifying occurrences of User Identity Fraud. More specifically, the invention relates to identifying User Identity Fraud by searching for similarities across databases and determining the validity of identity attributes submitted by new users that are attempting to gain access to computer systems.

A user or potential user of a computer system commits User Identity Fraud, when the user attempts to gain access to the computer system by knowingly misrepresenting their identifying attributes. Due to past activities, users may be prohibited from accessing information on certain computer systems. These users may attempt to circumvent such restrictions by altering their identity information when attempting to establish new accounts. Consequently, operators of computer systems have been in need of a means to identify these users, by searching across multiple databases for commonalities or similarities in the identity attributes provided by a user when creating a new account. Hence, a system and method have been developed to verify the identities of users who are attempting to establish new accounts, by performing a similarity search for new user identity attributes across multiple databases. By employing the current invention, operators can better understand who is actually granted access to their computer systems.

SUMMARY OF INVENTION

The current invention provides a method for verifying the identity of a new-user of a computer system, in which at least one identity attribute is received from the new-user and similarity searched against at least one database of denied-user identity attributes. The identity attributes may be received from the new user via Internet web sites, relational databases, data entry systems, and hierarchical databases. The identity attributes received from the new user and stored in the denied-user database may comprise user profiles.

A similarity search result is received, which may comprise the results and at least one hierarchical document stored in the at least one database of denied-user identity attributes. A positive or negative match is determined between the at least one new-user identity attribute and the denied-user identity attributes. This determination may comprise comparing the similarity search result to a first match tolerance level, wherein a positive match comprises a match, between the at least one new-user identity attribute and at least one denied-user identity attribute, that meets or exceeds the first match tolerance level; and a negative match comprises a match that does not meet or exceed the first match tolerance level.

The new-user is allowed to access the computer system, where a negative match has been determined, and the new-user is denied access to the computer system, where a positive match has been determined. Where a positive match is determined, it may be verified according to a secondary review process. This may include comparing the similarity search result to a second match tolerance level, allowing the new-user to access the computer system where the positive match does not meet or exceed the second match tolerance level, and ultimately denying the new-user access to the computer system, where the positive match meets or exceeds the second match tolerance level.

Once a positive or negative match has been determined, the method may then include the steps of adding the new-user identity to at least one database of valid user identities, where a negative match has been determined, and adding the new-user identity attributes to the at least one database of denied-user identity attributes, where a positive match has been determined.

The present invention is also directed to a software program embodied on a computer-readable medium incorporating the invented method.

The present invention is also directed to a system for verifying the identity of a new-user of a computer system, comprising a means for receiving at least one identity attribute from the new-user. The system also comprises at least one database for storing denied-user identity attributes and at least one database for storing valid user identities. The system also comprises a means for similarity searching the at least one identity attribute against the at least one database of denied-user attributes and a means for determining a positive or negative match between the at least one new-user attribute and the at least one database of denied-user identity attributes. The system further comprises a means for allowing the new-user to access the computer system, where a negative match has been determined and a means for denying the new-user access to the computer system, where a positive match has been determined. The system may also comprise a means for adding the new-user identity to the at least one database for storing valid user identities, where a negative match has been determined, and a means for adding the at least one new-user identity attribute to the at least one database of denied-user attributes, where a negative match has been determined.

The similarity search technique used in the present invention may be any similarity search technique that yields a similarity search result. For example, the similarity search technique used may be that described in U.S. Pat. No. 5,666,442 issued Sep. 22, 1999 to Wheeler, which is incorporated by reference herein. The similarity search technique used may also be that described in U.S. patent application Ser. No. 09/401,101 by Wheeler, et al., filed on Sep. 22, 1999, which is also incorporated by reference herein. Other similarity search techniques may be utilized, as well.

DETAILED DESCRIPTION

Figure 1:
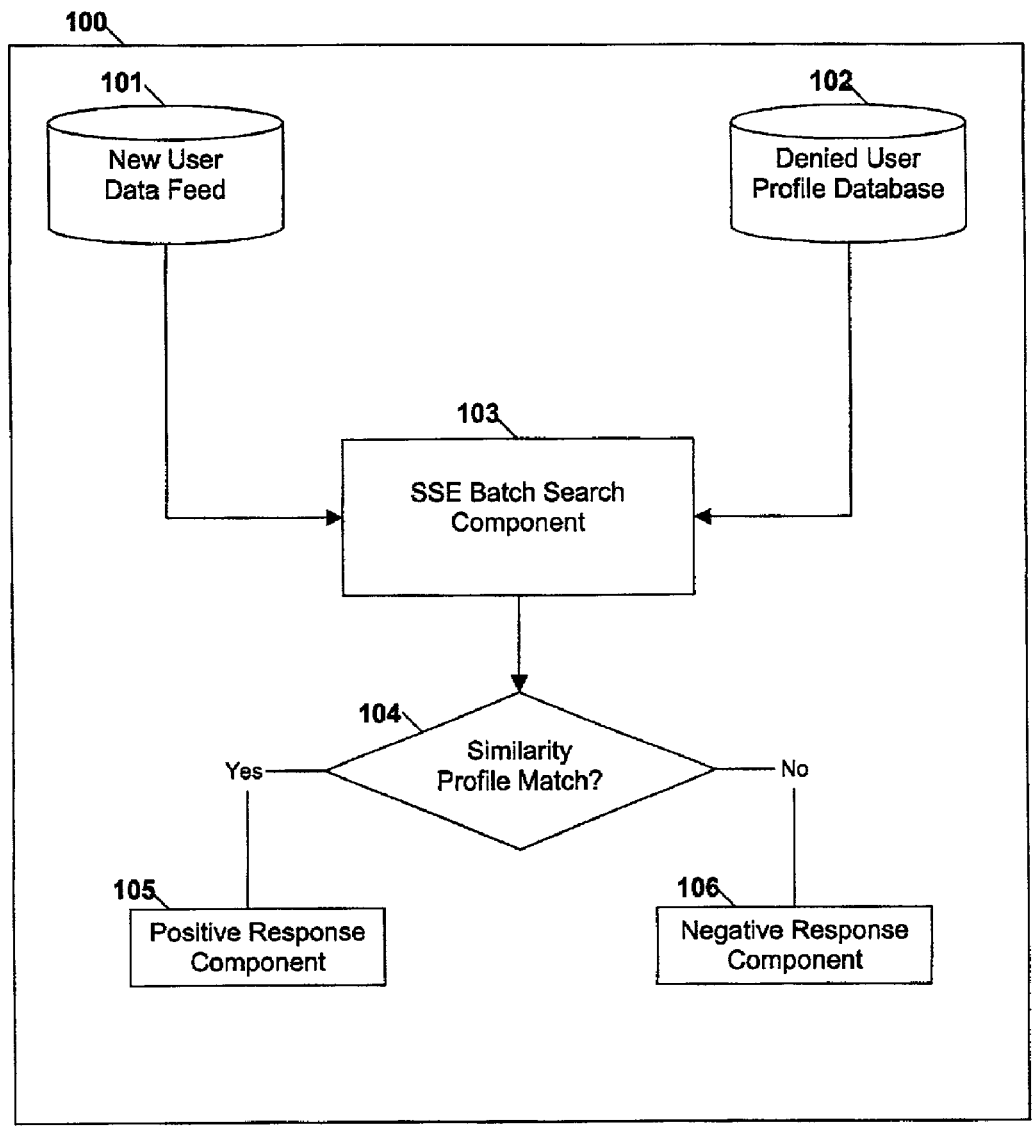
FIG. 1 is a block diagram illustrating an overview of the workflow and architecture used to determine user identity fraud via similarity searching, in accordance with the present invention.

Referring to the drawings in detail, the current invention is directed to a system and method for using similarity searching to determine the validity of new user identities. FIG. 1 illustrates an overview 100 of the current invention. The invention uses profile searching to search data from one data feed against another database, in order to find similarities between the two sets of data. A new user profile data feed 101 is transmitted to a similarity search engine (SSE) batch search component 103. The data feed 101 can come from many different sources where data can be acquired. The source of the data feed 101 may comprise, for example, Internet web sites, relational databases, data entry systems, and hierarchical databases.

The new user profile data feed 101 is used as an anchor for search component 103 to perform a similarity search against hierarchical documents in a denied users profile database 102. The search component 103 formulates the new user profile data feed 101 into a search request that will be used against the denied user profile database 102. Once the search component 103 completes its search of the denied user profile database 102, a similarity search result set is returned.

The similarity search result set is examined by a match component 104 that determines whether a profile match exists. The match component 104 uses pre-defined match tolerance levels to determine whether a profile match exists. The tolerance levels may be set by an operator of the computer system that is served by the current invention. The results from a similarity profile search fall into two categories: a positive profile match, which meets the specified tolerance level; or a negative profile match, which does not meet the specified tolerance level. Depending on the category, the results of the search are forwarded to a corresponding component in order to follow a programmed action.

If the similarity search result set meets the specified profile match tolerance, it is forwarded to the positive response component 105. The positive response component 105 performs predefined actions in response to a positive profile match. For example, if a strong similarity match is made from a new user data feed to a denied user database, a notification can be forwarded to an investigator or to another component for further review.

If the similarity result search set does not meet the specified tolerance level, then the new user profile is forwarded to the negative response component 106. The negative response component 106 is responsible for executing pre-defined actions for similarity profile results sets that do not meet the specified tolerance level. This could include forwarding the new user profile to a component that stores valid user accounts.

The denied user profile database 102 can be updated through manual updates, automatically by a profile match triggering system, or periodically through a re-import and re-indexing of the original source profile database.

Figure 2:
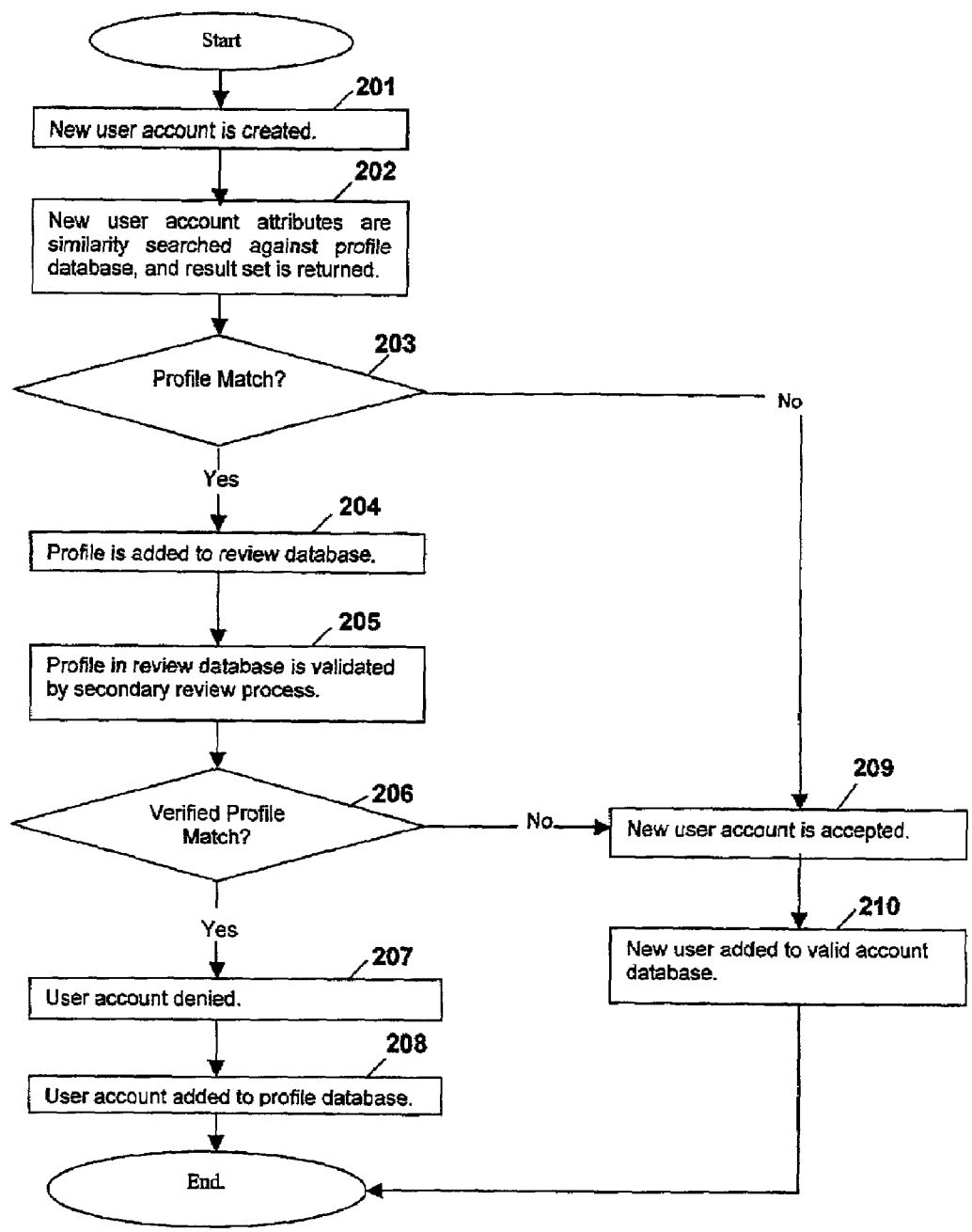
FIG. 2 is a flow diagram illustrating steps of a method for determining user identity fraud via similarity searching, in accordance with the present invention.

FIG. 2 illustrates a workflow for attempting to identify an occurrence of user identity fraud, in accordance with one embodiment of the current invention. The process begins with creating a new user account, in accordance with step 201. The creation of the account may be requested by the new user and may include the transmission of identity attributes to and from Internet web sites, relational databases, data entry systems, and hierarchical databases.

In accordance with step 202, a similarity search is performed on the new user account attributes, against a denied user profile database. A similarity search result set is returned. In accordance with step 203, the similarity search result set is checked to see if a profile match exists. The determination of a profile match may include determining whether the results meet a pre-specified match tolerance. The tolerance may be set by a person or persons employing the current invention to identify user identity fraud.

If the profile does not meet the match tolerance used for the determination in step 203, then the new user account is accepted, in accordance with step 209. The new user account is added to a valid account database, in accordance with step 210, and the new user is allowed all privileges of the account for which the new user applied.

If the profile meets the match tolerance level used in the determination of step 203, then the similarity search result set for the new user profile is forwarded to a user review database, in accordance with step 204. The user review database stores new user profiles that have matched profiles contained in the denied user database. The new user profile match in the user review database is then re-verified, in accordance with step 205. The validation may proceed according to a pre-defined secondary review process. The secondary review process may again entail determining whether the profile meets a pre-defined match tolerance. The tolerance may be more, less, or equally restrictive, compared to that used for the profile match determination in step 203. If the profile does not meet the specified match tolerance level for the validation in step 206, the new user profile is ultimately accepted, in accordance with step 209. The new user account is then added to a valid account database, in accordance with step 210, and the new user is allowed all privileges of the account for which the new user applied.

If the new user profile meets the specified match tolerance level used for the validation in step 206, then it is determined that the new user profile is in fact similar to an existing user profile in the denied user database. The new user profile is then denied, in accordance with step 207. Upon denial, the new user profile is added to the denied users database, in accordance with step 208. Thus, the new similarity profile will be included in subsequent searches and determinations of attempts at user identity fraud.

Figure 3:
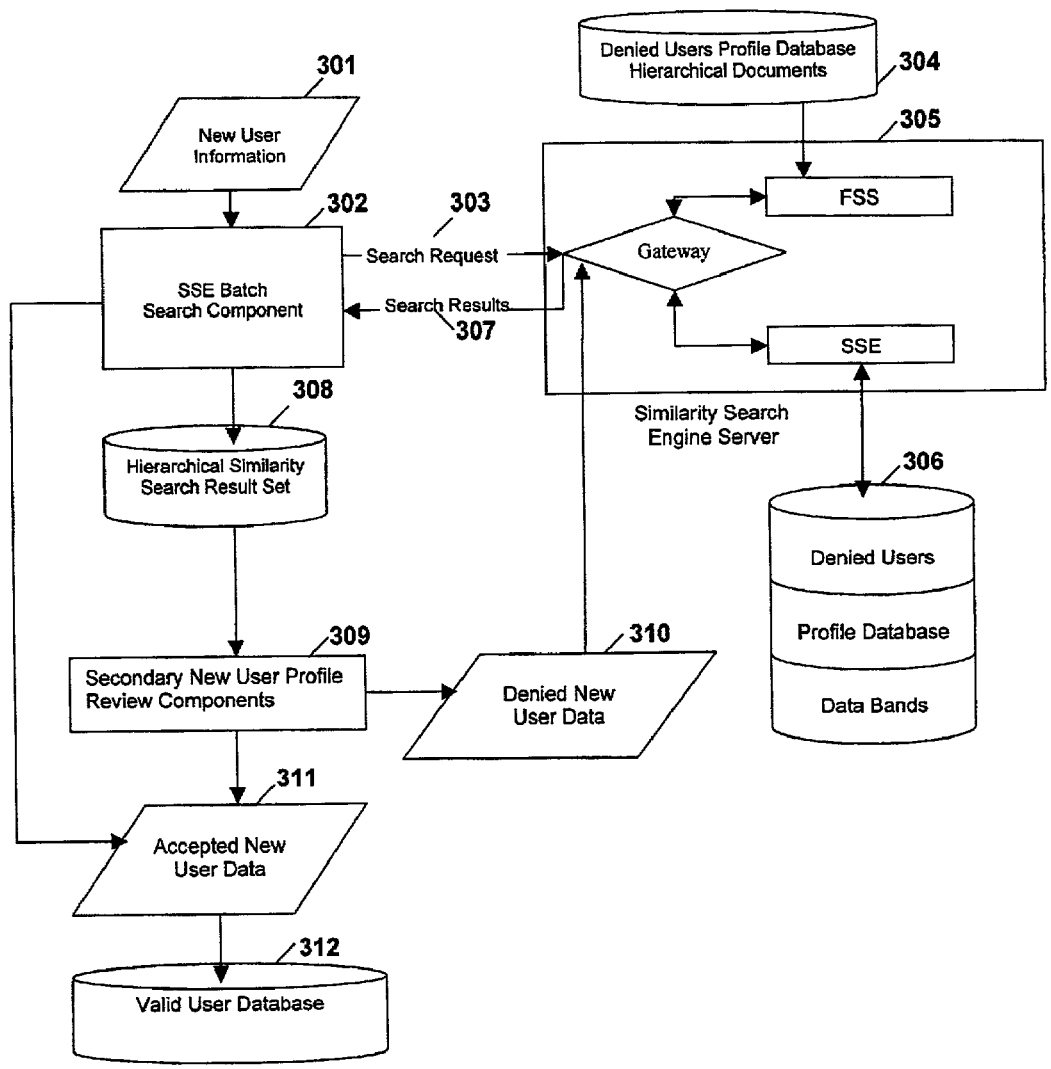
FIG. 3 is a block diagram illustrating architecture of a system for determining user identity fraud via similarity searching, in accordance with the present invention.

FIG. 3 illustrates a system architecture for identifying user identity fraud involving similarity searching a new user profile against a set of denied user profiles, in accordance with one embodiment of the current invention. When new user information 301 is provided to the system, it is submitted to the similarity search engine (SSE) batch search component 302. The search component 302 uses the new user information 301 as an anchor for the similarity search criteria that the search component 302 attempts to identify in the denied user database. The search component 302 formulates a similarity search request 303 from the new user information 301 by taking each tagged piece of information contained in the new user profile and adding it to a query with the same tag. The search component 302 then transmits the search request 303 to the similarity search engine server 305.

The similarity search engine server 305 contains several components. The search request 303 is received into the Gateway component of the similarity search engine server 305. The Gateway component processes the search request 303 and issues search commands to the similarity search engine (SSE). The SSE performs a similarity search across the data bands 306 of the denied users profile database. When results have returned from the SSE, the Gateway then sends requests to pull hierarchical documents from the denied users profile database 304, which is accessed through the File Storage System (FSS). The Gateway then sends search results 307 from the similarity search engine server 305 back to the SSE batch search component 302.

The similarity search results 307 may comprise the results from the search of the new user profile against the denied users database. The search results 307 may also comprise hierarchical documents retrieved from the denied users profile database 304, which contain the user information for the matching profiles.

When the similarity search results 307 are returned to the cross-database search component 302, the search component 302 determines whether there is a profile match. This determination may include the use of a pre-specified match tolerance level, as described previously. If a profile match does not exist, then the search results are forwarded as accepted new user data 311, to a valid user database 312 for storage, and the new user is allowed future access to the system. If a profile match exists, the search results are forwarded as a hierarchical similarity search result set 308, to a secondary new user profile review component 309, for storage and review.

The hierarchical similarity search result set 308 is added to a user review database in preparation for a secondary review process that ultimately confirms or denies the validity of the new user. The secondary user review component 309 uses a predefined secondary review process to determine whether the new user profile is in fact similar to the denied user profile, within a match tolerance level that may be pre-defined by a system operator. If the user profile meets the match tolerance level, then the new user account is denied, and the denied new user data 310 is then added to the denied user profile database 304 via the Gateway of the similarity search engine server 305.

If the new user profile does not meet the match tolerance level used during the secondary review process, then the new user profile is forwarded as accepted new user data 311 to a valid user database 312 for storage, and the new user is allowed future access to the system.

The current invention is also directed to a software program embodied on computer-readable media, incorporating the method of the current invention.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain embodiments, it should be apparent that modifications and adaptations to those embodiments may occur to persons skilled in the art without departing from the spirit and scope of the present invention as set forth in the following claims.

What is claimed is:

1. A method for verifying an identity of a new-user of a computer system, comprising:
   a. receiving at least one identity attribute from the new-user;
   b. similarity searching the at least one new-user identity attribute against at least one database of denied-user identity attributes;
   c. receiving a similarity search result;
   d. determining a positive or negative similarity match between the at least one new-user identity attribute and the denied-user identity attributes based on the similarity search results;
   e. allowing the new-user to access the computer system, where a negative similarity match has been determined; and
   f. denying the new-user access to the computer system, where a positive similarity match has been determined.

2. The method of claim 1, wherein the at least one new-user identity attribute comprises a new-user profile.

3. The method of claim 2, wherein the at least one database of denied-user identity attributes comprises at least one database of denied-user profiles.

4. The method of claim 3, wherein the step of similarity searching comprises similarity searching the new-user profile against the at least one denied-user profile database.

5. The method of claim 1, wherein the step of determining a positive or negative similarity match further comprises comparing the similarity search result to a first match tolerance level.

6. The method of claim 5, wherein a positive similarity match comprises a similarity match, between the at least one new-user identity attribute and at least one denied-user identity attribute, that meets or exceeds the first match tolerance level.

7. The method of claim 5, wherein a negative similarity match comprises a similarity match, between the at least one new-user identity attribute and at least one denied-user identity attribute, that does not meet or exceed the first match tolerance level.

8. The method of claim 1, further comprising, where a positive similarity match has been determined, verifying the positive similarity match via a secondary review, after the step of determining whether a positive or negative similarity match exists and before the step of denying the new-user access to the computer system.

9. The method of claim 8, wherein the step of verifying the positive similarity match further comprises comparing the similarity search result to a second match tolerance level.

10. The method of claim 8, further comprising allowing the new-user to access the computer system, where the positive similarity match does not meet or exceed the second match tolerance level.

11. The method of claim 8, further comprising denying the new-user access to the computer system, where the positive similarity match meets or exceeds the second match tolerance level.

12. The method of claim 1, further comprising, after determining whether a positive or negative similarity match exists, the steps of:
- adding the new-user identity to at least one database of valid user identities, where a negative similarity match has been determined; and
- adding the new-user identity attributes to the at least one database of denied-user identity attributes, where a positive similarity match has been determined.

13. The method of claim 1, wherein the at least one new-user identity attribute is received from at least one component, chosen from a group consisting of Internet web sites, relational databases, data entry systems, and hierarchical databases.

14. The method of claim 1, wherein the similarity search result comprises at least one hierarchical document stored in the at least one database of denied-user identity attributes.

15. A method for verifying an identity of a new-user of a computer system, comprising:
   a. receiving at least one identity attribute from the new-user;
   b. similarity searching the at least one identity attribute against at least one database of denied-user identity attributes;
   c. receiving a similarity search result;
   d. determining a positive or negative similarity match between the at least one new-user identity attribute and the denied-user identity attributes based on the similarity search result;
   e. allowing the new-user to access the computer system and adding the new-user identity to at least one database of valid user identities, where a negative similarity match has been determined;
   f. where a positive similarity match has been determined, verifying the positive similarity match via a secondary review;
   g. allowing the new-user to access the computer system and adding the new-user identity to at least one database of valid user identities, where the positive similarity match is not verified; and
   h. denying the new-user access to the computer system and adding the at least one new-user identity attribute to at least one database of denied-user identity attributes, where the positive similarity match is verified.

16. The method of claim 15, wherein the at least one new-user identity attribute comprises a new-user profile.

17. The method of claim 16, wherein the at least one database of denied-user identity attributes comprises at least one database of denied-user profiles.

18. The method of claim 17, wherein the step of similarity searching comprises similarity searching the new-user profile against the at least one denied-user profile database.

19. The method of claim 15, wherein the step of determining a positive or negative similarity match further comprises comparing the similarity search result to a first match tolerance level.

20. The method of claim 19, wherein a positive similarity match comprises a similarity match, between the at least one new-user identity attribute and at least one denied-user identity attribute, that meets or exceeds the first match tolerance level.

21. The method of claim 19, wherein a negative similarity match comprises a similarity match, between the at least one new-user identity attribute and at least one denied-user identity attribute, that does not meet or exceed the first match tolerance level.

22. The method of claim 15, wherein the step of verifying the positive similarity match further comprises comparing the similarity search result to a second match tolerance level.

23. The method of claim 15, wherein the at least one new-user identity attribute is received from at least one component, chosen from a group consisting of Internet web sites, relational databases, data entry systems, and hierarchical databases.

24. The method of claim 15, wherein the similarity search result comprises at least one hierarchical document stored in the at least one database of denied-user identity attributes.

25. A system for verifying an identity of a new-user of a computer system, comprising:
- a means for receiving at least one identity attribute from the new-user;
- at least one database for storing denied-user identity attributes;
- at least one database for storing valid user identities;
- a means for similarity searching the at least one identity attribute against the at least one database of denied-user attributes;
- a means for determining a positive or negative similarity match between the at least one new-user attribute and the at least one database of denied-user identity attributes;
- a means for allowing the new-user to access the computer system, where a negative similarity match has been determined;
- a means for denying the new-user access to the computer system, where a positive similarity match has been determined;
- a means for adding the new-user identity to the at least one database for storing valid user identities, where a negative similarity match has been determined; and
- a means for adding the at least one new-user identity attribute to the at least one database of denied-user attributes, where a positive similarity match has been determined.

26. A computer-readable medium containing instructions for controlling a computer system to implement the method of claim 1.

27. A computer-readable medium containing instructions for controlling a computer system to implement the method of claim 15.

28. A method for verifying an identity of a new user of a computer system, comprising:
- similarity searching one or more new user identity attribute profile data records against denied-user identity attribute profile data records;
- receiving one or more similarity search results sets, each result set having a corresponding new user identity attribute profile data record and a corresponding similarity match score;
- comparing each similarity match score with a pre-determined match tolerance level for determining negative similarity match scores and positive similarity match scores;
- for each negative similarity match score having a value of less than or equal to the pre-determined match tolerance level, allowing access to the computer system by a new user associated with a new user identity attribute profile data record corresponding to a negative similarity match score; and for each positive similarity match score having a value greater than the pre-determined match tolerance level, denying access to the computer system by a new user associated with a new user identity attribute profile data record corresponding to a positive similarity match score.

29. The method of claim 28, wherein the step of denying access comprises:

confirming whether the positive similarity match score exists between the new user identity attribute profile data record and a corresponding suspended-users identity attribute profile data record;

allowing a new user associated with a new user identity attribute profile data record corresponding to a positive similarity match score to access the computer system, where the positive similarity match score is not confirmed; and denying a new user associated with a new user identity attribute profile data record corresponding to a positive similarity match score access to the computer system, where the positive similarity match score is confirmed.

* * * * *